United States Patent
Mullens et al.

(10) Patent No.: US 9,952,957 B2
(45) Date of Patent: *Apr. 24, 2018

(54) DYNAMIC PARAMETER FOR MULTIPLE TYPES OF INPUTS BASED ON DIFFERENT INPUT PROFILES FOR ELECTRONIC INPUT/OUTPUT (I/O) DEVICES

(71) Applicant: Apple Inc., Cupertino, CA (US)

(72) Inventors: Christopher T. Mullens, San Francisco, CA (US); Jesse Michael Devine, Oakland, CA (US); Marco Sebastiani, San Bruno, CA (US); Nima Parivar, South San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/011,346

(22) Filed: Jan. 29, 2016

(65) Prior Publication Data

US 2016/0147629 A1    May 26, 2016

Related U.S. Application Data (63) Continuation of application No. 13/357,717, filed on Jan. 25, 2012, now Pat. No. 9,262,182.

(51) Int. Cl.
| | |
|---|---|
| *G06F 1/32* | (2006.01) |
| *G06F 11/30* | (2006.01) |
| *G06F 9/445* | (2018.01) |
| *G06F 1/26* | (2006.01) |
| *G06F 3/041* | (2006.01) |

(Continued)

(52) U.S. Cl.
CPC .......... *G06F 11/3051* (2013.01); *G06F 1/266* (2013.01); *G06F 1/325* (2013.01); *G06F 1/3215* (2013.01); *G06F 3/0416* (2013.01); *G06F 3/04847* (2013.01); *G06F 3/04883* (2013.01); *G06F 9/4451* (2013.01); *G06F 11/3065* (2013.01); *G06F 11/328* (2013.01);

(Continued)

(58) Field of Classification Search
CPC .... G06F 9/4411; G06F 1/3203; G06F 1/3215; G06F 11/3051
USPC ....................................... 713/100; 710/14–18
See application file for complete search history.

(56) References Cited

U.S. PATENT DOCUMENTS

| | | |
|---|---|---|
| 5,977,957 A | 11/1999 | Miller et al. |
| 6,611,921 B2 | 8/2003 | Casebolt et al. |

(Continued)

OTHER PUBLICATIONS

PCT International Search Report, Application No. PCT/US2013/022771, dated Apr. 30, 2013.

(Continued)

*Primary Examiner* — Tammara Peyton
(74) *Attorney, Agent, or Firm* — Kilpatrick Townsend & Stockton (57) ABSTRACT

A method for dynamically modifying a characteristic for an electronic device. The method includes activating by a processor a first profile having a first characteristic setting and a first state for an input/output (IO) device. Once the first profile is activated, receiving an input by a sensor and communicating the input to the processor. The method then includes activating by the processor a second profile having a second characteristic setting and a second state for the IO device. The second profile modifies a component of the IO device to include a second characteristic setting and a second state.

20 Claims, 7 Drawing Sheets

(51) Int. Cl.
  *G06F 3/0484* (2013.01)
  *G06F 3/0488* (2013.01)
  *G06F 11/32* (2006.01)
  *G06F 9/44* (2018.01)

(52) U.S. Cl.
  CPC .......... *G06F 1/3206* (2013.01); *G06F 9/4411* (2013.01); *Y02B 60/185* (2013.01)

(56) References Cited

U.S. PATENT DOCUMENTS

| | | |
|---|---|---|
| 7,062,547 B2 | 6/2006 | Brown et al. |
| 7,161,578 B1 | 1/2007 | Schneider |
| 7,425,945 B2 | 9/2008 | Arrigo et al. |
| 7,479,944 B2 | 1/2009 | Casebolt et al. |
| 7,696,980 B1 | 4/2010 | Piot et al. |
| 7,787,405 B2 | 8/2010 | Dellinger et al. |
| 8,543,172 B2 | 9/2013 | Ranta |
| 9,262,182 B2 * | 2/2016 | Mullens ................ G06F 9/4451 |
| 2005/0064916 A1 | 3/2005 | Ozluturk et al. |
| 2006/0047783 A1 | 3/2006 | Tu |
| 2007/0111796 A1 | 5/2007 | Giaimo et al. |
| 2008/0157601 A1 | 7/2008 | Masciarelli et al. |
| 2008/0168267 A1 | 7/2008 | Bolen et al. |
| 2009/0267777 A1 | 10/2009 | Kumar et al. |
| 2010/0017411 A1 | 1/2010 | Nakamura et al. |
| 2010/0039381 A1 | 2/2010 | Cretella, Jr. et al. |
| 2010/0106994 A1 | 4/2010 | Challener et al. |
| 2011/0093729 A1 | 4/2011 | Mucignat et al. |
| 2011/0111799 A1 | 5/2011 | Kothari et al. |
| 2011/0187931 A1 | 8/2011 | Kim |
| 2011/0207509 A1 | 8/2011 | Crawford |
| 2011/0251807 A1 | 10/2011 | Rada et al. |
| 2012/0268378 A1 | 10/2012 | Tokutake |

OTHER PUBLICATIONS

Written Opinion, Application No. PCT/US2013/022771, dated Apr. 30, 2013.

\* cited by examiner

DYNAMIC PARAMETER FOR MULTIPLE TYPES OF INPUTS BASED ON DIFFERENT INPUT PROFILES FOR ELECTRONIC INPUT/OUTPUT (I/O) DEVICES

CROSS-REFERENCE TO RELATED APPLICATIONS

This application is a continuation of prior U.S. application Ser. No. 13/357,717, filed Jan. 25, 2012, of the same title, the contents of which are incorporated herein by reference in their entirety for all purposes.

TECHNICAL FIELD

The present invention relates generally to electronic devices and more specifically, to power management in electronic devices.

BACKGROUND

Electronic devices such as digital music players, video players, smart phones, mobile gaming devices, laptops, and so on may include a variety of peripheral devices and/or input/output devices such as mice, track pads, displays, keyboards, and so on. These various devices may include a single power management profile that determines whether a particular device is in an active, inactive, sleep, or disconnected state. Based on the particular state, the power management profile may adjust particular settings or parameters for the device. For example, for a mouse, the sampling rate in the sleep state may be significantly less than a sampling rate during the active state. The power management profile for a particular device may typically be stored within firmware for the device. Thus, in many instances, the power management profile may be static for the device. However, often different users may have different usage characteristics, which may not be accommodated by the static profile of the device. For example, a user who uses his or her electronic device to browse the internet may prefer to conserve power in a mouse, as compared to a user who using his or her electronic device to play computer games, who may prefer increased responsiveness in the mouse as compared to power conservation.

SUMMARY

Examples of embodiments described herein may take the form of a method for dynamically altering a characteristic for an auxiliary device in communication with a computing device. The method includes determining by one or more sensors at least one user input corresponding to the auxiliary device; using the at least one user input, determining by a processor whether the at least one user input is consistent with a current profile having a first state and a second state and if the at least one user input is not consistent with the current profile, activating a new profile, wherein the new profile has at least a third state and a fourth state.

Other embodiments may take the form of a computing device. The computing device is in communication with an input/output (IO) device including a sensor configured to detect a user input. The computing device further includes a processor in communication with IO device. The processor is configured to receive the user input detected by the sensor, determine if a current characteristic profile having a current state should be modified based on the user input, and if the current characteristic profile should be modified implementing a new characteristic profile. The new characteristic profile modifies at least one characteristic of the IO device and implements a first state and a second state for the at least one characteristic.

Still other embodiments may include a method for dynamically modifying a characteristic for an electronic device. The method includes activating by a processor a first profile having a first characteristic setting and a first state for an input/output (IO) device. Once the first profile is activated, receiving an input by a sensor and communicating the input to the processor. The method then includes activating by the processor a second profile having a second characteristic setting and a second state for the IO device. The second profile modifies a component of the IO device to include a second characteristic setting and a second state.

DETAILED DESCRIPTION

Some embodiments described herein may take the form of a method for dynamically switching one or more parameters or characteristic profiles for an electronic device. The characteristic profiles may control characteristics of one or more input/output or peripheral devices. The controlled characteristics may be related to power consumption, responsiveness, sampling rates, transition times, and so on. The term characteristic is intended to cover substantially any type of parameter, setting, or other data that may control one or more aspects of a device, component, or combination of components. The terms "input/output device," "peripheral device," and "auxiliary device" are intended to cover substantially any type of device that may be in communication with a processor, and may cover input only devices, output only devices, or combination input/output devices.

The methods described herein may provide a number of different profiles that may be related to different user settings, applications, or user behavior. For example, there may be a "gaming profile," a "power saving profile," a "slow typist" profile, and so on. The method may provide for a transition between profiles based on one more use inputs to the electronic device and/or the input/output devices. The transition may be automatic or manual. In other words, the electronic device may change the profile of one or more input/output devices based on sensed inputs or the electronic device may change the profiles based on inputs manually input by the user or user settings.

As a non-limiting example, the method may be used to switch a profile of an input/output device, such as a mouse, between a normal operating profile and a gaming profile.

The normal operating profile may regulate a sampling rate of the mouse to a low value, providing a baseline level of responsiveness, in order to provide a power saving benefit to the mouse. The gaming profile may increase the sampling rate of the mouse, providing increased responsiveness, as compared to the normal operating profile. However, while operating the gaming profile the mouse may quickly consume power, as compared to when the mouse is operating the normal operating profile.

Continuing with the example, while a user uses a first application or a group of applications, such as a word processing application or internet browser application, the normal operating profile may control select characteristics of the mouse. When the user switches applications to a second application or group of applications, such as a game or other application requiring increased responsiveness from the mouse, the method may switch the profile of the mouse to the gaming profile. Thus, the user experience with the selected application may be enhanced as the responsiveness of the mouse may be increased, which in this case may be preferred over the power saving benefits of the normal operating profile.

To determine whether to switch between a first profile and a second profile, the electronic or computing device may use any one or a combination of the following inputs: use inputs from various sensors and/or from the input/output device (e.g., typing rate, number of fingers used on a track pad, clicking rate, and so on); the user selection (e.g., by using a graphical user interface the user may select one or more profiles or characteristics to modify); user behavior or settings (e.g., fine tracking precision while using a photo editing application); an active application; time of day; the user currently signed into or interacting with the computing device; data provided by other sensors of the computing device (e.g., light sensors, accelerometers, gyroscopes, other motion sensors and the like); and so on.

In some embodiments, the method may also correct a profile if directly selected by the user. For example, if the user selects his or her own profile and based on certain user inputs the computing device may determine that another profile may be better suited for the user, and thus may switch the profile.

It should be noted that each profile may have control or correspond to one or more states for the device. For example, the normal operating profile may have an active, inactive, sleep, and/or disconnected state. Each of these states may have varied characteristic settings for the device, such as a first sampling rate for the active profile and a second sampling rate for the sleep profile. Thus, by dynamically switching between profiles and as each profile may include one more states of the device, various characteristics of the device may be optimally configured based on the current inputs and use of the device.

IO Devices and the Computing Device

Figure 1A:
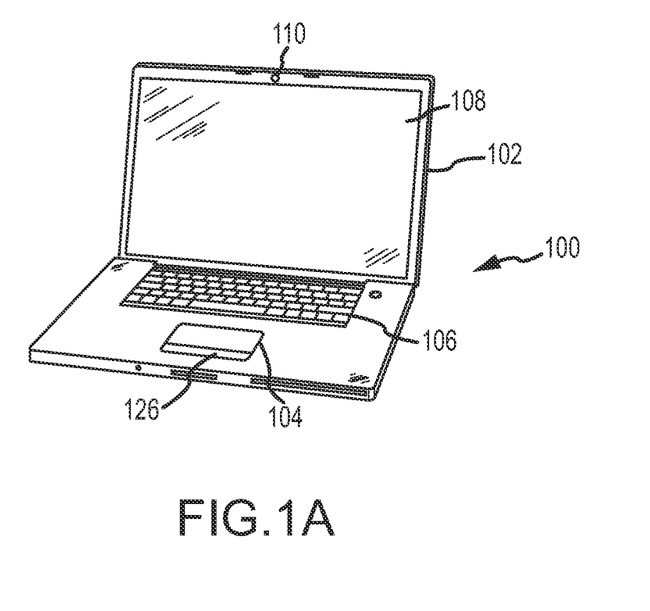
FIG. 1A is a perspective view of a computing device in communication with a plurality of integrated input/output devices.
Figure 1B:
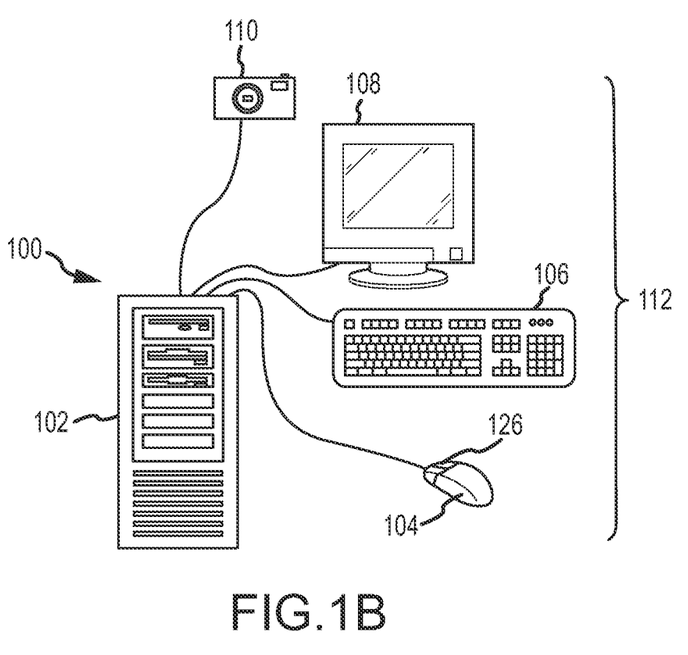
FIG. 1B is another embodiment of the computing device in communication with a plurality of separate input/output devices.

Turning now to the figures, an illustrative electronic device that may implement and/or use a method for dynamically switching profiles will now be discussed. FIG. 1A is a perspective view of a system 100 with a computing device 102 including a plurality of integrated input/output (IO) devices 112. FIG. 1B is a perspective view of a second embodiment of the system 100 including a computing device 102 in communication with a plurality of external IO devices 112. The IO devices 112 may be substantially any type of input/output device and/or peripheral device. For example, in the system 100, the IO devices 112 may include a mouse 104 or track pad, a keyboard 106, a display 108, and/or a camera 110. As shown in FIG. 1B, the IO devices 112 may be separate from the computing device 102, or as shown in FIG. 1A the IO devices may be integrated therein. Each of the IO devices 112 may be in communication with the computing device 102 either directly or indirectly and either through a wired connection or a wireless connection.

It should be noted that the term "input/output device" is meant to encompass substantially all types of input or output devices. For example, as used herein the term IO device may include devices that perform only input functions, only output functions, or a combination of both. Additionally, the terms IO device, auxiliary device, and peripheral device are used interchangeably herein and are meant to refer to devices both integrated within the computing device 102 or separate therefrom. Moreover, the IO devices 112 illustrated in FIGS. 1A and 1B are meant as illustrative and other IO devices 112 are envisioned, such as, but not limited to, joysticks, remote controllers, game controllers, speakers, other electronic devices, and so on.

Figure 2:
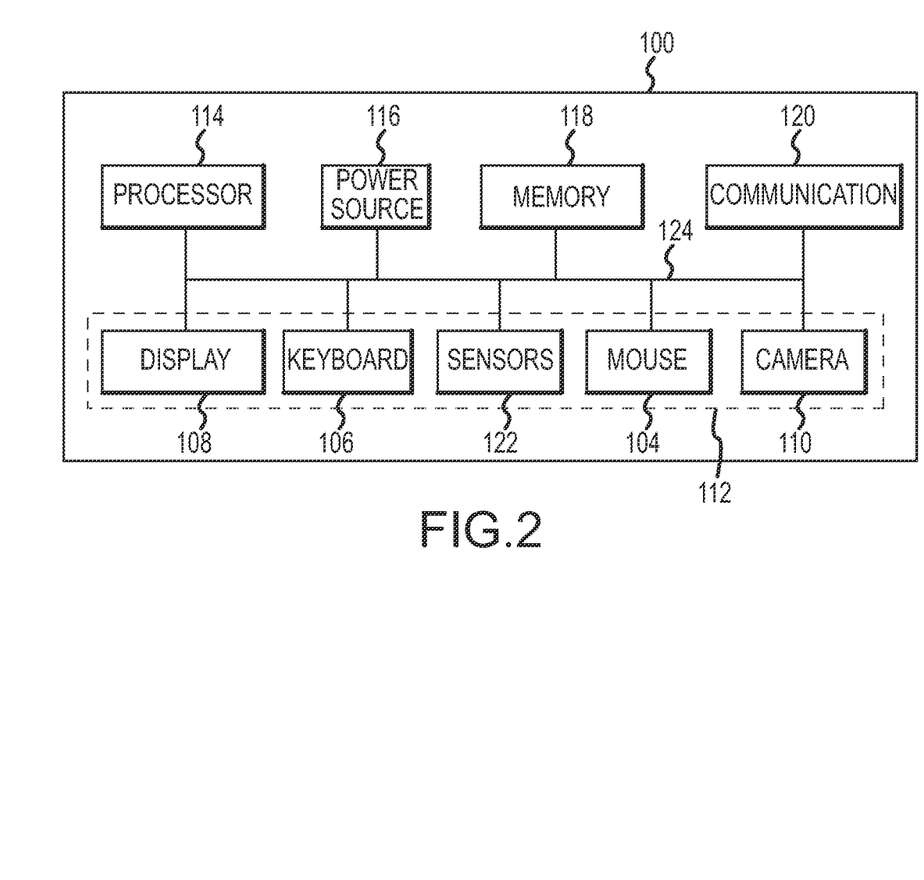
FIG. 2 is a block diagram of the computing device.

With reference to FIGS. 1A and 1B, the computing device 102 may be substantially any type of computer or electronic device, non-limiting examples of which include a laptop, desktop, server, smart phone, video game console, set top box, or digital music player. FIG. 2 is a block diagram of the system 100 including the computing device and the one or more IO devices 112. As illustrated in FIG. 2, the computing device 102 may include a processor 114, a power source 116, memory 118, and a communication mechanism 120, which may each be in communication by one or more system buses 124. It should be noted that in some embodiments one or more of the IO devices 112 may include components similar to the computing device 102. For example, the IO devices 112 may include a processor, memory, and a communication mechanism. These components may be substantially the same as those in the computing device 102, but may be smaller and/or less powerful.

The processor 114 may control operation of the computing device 102 and/or one or more of the IO devices 112. The processor 114 may be in communication with the IO devices 112, the memory 118, the communication mechanism 128, and/or sensors 122. The processor 114 may be any electronic device cable of processing, receiving, and/or transmitting instructions. For example, the processor 114 may be a microprocessor or a microcomputer.

The communication mechanism 120 may receive and transmit various electrical signals. The communication mechanism 120 may be used to send and receive data from the IO devices 112. Additionally, the communication mechanism 120 may be used to place phone calls from the computing device 102, may be used to receive data from a network, or may be used to send and transmit electronic signals via a wireless or wired connection (e.g., Internet, WiFi, radio waves, Bluetooth, or Ethernet). In one embodiment, the communication mechanism 120 may include a transmitter in communication with the processor 114 to send data to other devices and a receiver configured to receive signals from other devices.

Figure 3:
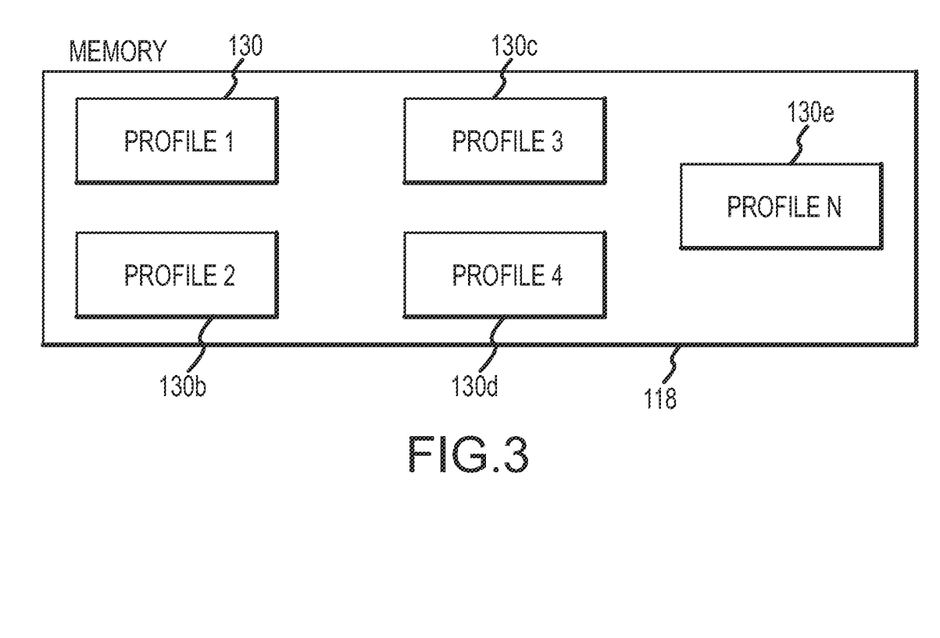
FIG. 3 is a block diagram of a memory for the computing device including a plurality of profiles for controlling one or more characteristics of the input/output devices.

The memory 118 may store electronic data that may be utilized by the computing device 102. For example, the memory 118 may store electrical data containing any type of content, non-limiting examples of which include audio files, video files, document files, and data files. Stored data may correspond to one or more various applications and/or operations of the computer. In some embodiments, the memory 118, as shown in FIG. 3, may store one or more profiles for the IO devices 112.

The memory 118 may be of any format, including, but not limited to, non-volatile storage, a magnetic storage medium, optical storage medium, magneto-optical storage medium, electrical storage medium, read only memory, random access memory, erasable programmable memory, and flash memory. The memory 188 may be provided local to and/or remote from the computer.

The power source 116 may be substantially any type of device and/or connection that may provide power to the computing device 102 and/or the IO devices 112. For example, the power source 116 may be one or more batteries, a power cord configured to connect to a power outlet, or the like.

The computing device 102 may also be in communication with one or more sensors 122. The sensors 122 may be integrated with the computing device 102 or may be connected to one or more of the IO devices 112. The sensors 122 may be substantially any type of device configured to detect one more inputs. For example, the sensors 122 may include a capacitive sensor, accelerometer, gyroscope, heat sensor, resistive sensor, moisture sensor, image sensor (which may be separate from or integrated with the camera 110), force sensor, power sensor, or the like. The sensors 122 may be configured to detect certain user inputs or environmental inputs and as such may be positioned in substantially any location of the system 100.

With reference to FIGS. 1A-2, as briefly described above, the system 100 includes one or more IO devices 112. In some examples, the IO devices 112 may include the mouse 104 (or track pad), the keyboard 106, the display 108, and/or a camera 110. The mouse 104 may be used by the user to move a cursor or other tracking icon across the display 108. In some instances the mouse 104 may include one or more input buttons 126 that may provide additional inputs to the mouse 104.

The keyboard 106 may include one or more keys or buttons that may be selected by the user. For example, each key may include a symbol and when selected by the user the symbol may be provided as an input to the computing device 102.

The display 108 provides an output for the computing device 102 and in some embodiments may also function as an input for the computing device 102 (e.g., as a capacitive or infrared touch screen). The display 108 may be a liquid crystal display, plasma display, light emitting diode display, or the like. In some embodiments, the display 108 may display an output such as a graphical user interface (GUI), an application interface, a cursor or icon correlated to the one or more IO devices 112, and so on.

As briefly discussed above, the memory 118 may include data correlating to a plurality of profiles that may be used to vary or control one or more characteristics or settings for the computing device 102 and/or IO devices 112. FIG. 3 is a block diagram illustrating a plurality of profiles that may be used to modify and/or control the settings for a particular IO device 112 and/or the computing device 102. There may be any number of profiles, and these profiles 130a-130e may be stored in the memory 118 which may be part of one or more of the IO devices 112 or the computing device 102. As shown in FIG. 3, there may a Profile 1 130a, Profile 2 130b, Profile 3 130c, Profile 4 130d, and so on, up to a Profile N 130e (where N is an arbitrary number). However, in actuality there may be fewer or more profiles than those shown in FIG. 3.

As briefly mentioned above, in some instances, the IO devices 112 may include components that may be similar to, or perform similar functions as, the memory 118 in the computing device 102. In these instances, the plurality of profiles for a specific IO device 112 may be stored on memory internal to the IO device 112 and then may be accessible to the computing device 102 through a device driver or other connection mechanism. However, in other embodiments, such as shown in FIG. 3, the computing device 102 may store the profiles 130a-130e for each IO device 112.

Profiles and Characteristics Varied by the Profiles

Each IO device 112 may have a separate profile 130a-130e that controls characteristics specific to the IO device 112. Further, the computing device 102 may include one or more profiles that control characteristics for one or more IO devices 112, and/or a combination of profile types may be used. In some embodiments a single profile 130a-130e may control one or more characteristics for the computing device 102 and each of the IO devices 112. For example, there may be a gaming profile that may determine certain characteristics for the mouse 104, the keyboard 106, the display 108, and the processor 114. Or, in other embodiments, a gaming profile may only control the mouse 104, and thus only characteristics relating to the mouse 104 may be controlled by that profile and the keyboard 106 may have its own separate keyboard gaming profile. In yet other embodiments, a "gaming profile" for the computing device 102 may activate one or more separate "gaming profiles" on one or more IO devices 112.

Each of the profiles 130a-130e may be configured to control or otherwise vary one or more characteristics or settings for the IO devices 112. For example, each of the IO devices 112 may have one or more characteristics or settings that may be modified depending on a desired behavior (based on the selected profile). As a non-exhaustive and illustrative list, some characteristics which may be changed for a particular IO device 112 may include a report rate, a sampling rate, dots per square inch value (DPI), data quantization values, tracking speed, an acceleration curve, latency, debounce or input sensitivity, timeouts, sensitivity, speed, and/or processor speed. Many of these characteristics may include a compromise between responsiveness, accuracy, and/or power efficiency. Therefore, each of the characteristics may have different settings that may be desired depending on the user, application, or the like. Other characteristics may be modified based upon improving a user experience or based on the particular behaviors or desires of the user.

The report rate or polling rate may determine the frequency at which the IO device 112 reports its determined inputs to the processor 114. For example, a particular IO device 112 may send data to processor 114 at 1 ms intervals or at 3 ms intervals (these are sample values for illustrative purposes only). The more frequently the IO device 112 may report inputs to the processor 114 the more quickly the IO device 112 may seem to respond to a particular input. However, an increased report rate may also increase the power consumption of the IO device 112, as the device 112 may have to send data more frequently.

The sampling rate for one or more of the IO devices 112 may determine a rate at which the IO device 112 outputs or samples for new data inputs. In some embodiments, the sampling rate may be a rate internal to the IO device 112 (such as for a sensor of the IO device 112). The report rate need not necessarily match the sample rate. In some embodiments, the report rate may be lower than the sample rate. Thus, the device 112 may read multiple data packets between reports, and transmit multiple data packets substantially simultaneously to the processor 114. However, in many embodiments, the sampling rate and the report rate may be selected to the same or approximately the same, so that, as the IO device 112 checks for data, it may then send any new data that it may have collected. In these embodiments, depending on the profile selected, both of these characteristics may be changed simultaneously. However, in other embodiments, the report rate and the sampling rate may be changed separately from each other.

The DPI or counts per inch (CPI) value may refer to characteristics for either the display 108 or the mouse 104. Depending on the specific IO device 112 the DPI value may affect a different type of setting or characteristic. As an example, the DPI characteristic may control the tracking precision or sensitivity of the mouse 104 or may control an appearance of objects on the display 108.

In embodiments where the mouse 104 may include an optical sensor to sense motion, the DPI characteristic may be the resolution of the optical sensor. For example, with a DPI set at 800, the mouse 104 may be able to sense motions as small as $\frac{1}{800}^{th}$ of an inch.

With respect to the display 108, the DPI characteristic may alter the appearance of certain objects, such as icons or the like, displayed on a GUI. It should be noted that the DPI may affect other IO devices 112 in similar manners, and the above examples are meant as illustrative only.

The quantization characteristic may determine a sensitivity for restraining certain data values. In other words, data values may be rounded or packetized into predetermined values, which may control how frequently data is reported by the IO device 112 to the computing device 102. For example, with respect to the mouse 104, the quantization value may determine the minimum amount of motion that may be required for the mouse 104 to register motion and create an input report. Continuing this example, with a quantization at a first value the user may have to move the mouse 104 a minimum distance before the mouse 104 generates an input. By adjusting the quantization value, the minimum number may be increased or decreased, which may increase or decrease the sensitivity and/or number of reports generated by the particular IO device 112.

As another example, with a track pad, a decreased quantization value may reduce the power consumed by the track pad; however, the track pad may be less responsive to "quick taps" by the user. For example, in some instances a user may tap twice on the track pad in rapid succession to indicate a selection or otherwise provide a specific input. With a decreased quantization value, the "quick taps" may not reach the threshold value to be rounded to an input value. In instances where the computing device 102 is portable or running on a portable power source, a decreased quantization may be desired over the decreased responsiveness.

The tracking speed may vary the speed of an output of the IO device 112. With respect to the mouse 104, the tracking speed characteristic may vary a speed relationship of a cursor on the display 108 as compared with the speed that the user may move the mouse 104. For example, a slow tracking speed may require the user to move the mouse faster to achieve the same cursor speed as a fast tracking speed with a slower input motion by the user.

The acceleration curve characteristic may vary the tracking speed for an output of the IO device 112 as a function of acceleration of an input to the IO device 112. For example, if the mouse 104 is moved quickly across a surface, the speed of a cursor or icon on the display 108 corresponding to the physical movement of the mouse 104 may increase. Conversely, if the mouse 104 is moved slowly and the acceleration is reduced, the speed of the cursor corresponding to the physical movement may decrease, which may allow for increased sensitivity for the mouse 104. In this example, sensitivity may be related to the mouse 104 movement required to get the cursor to move a certain distance. Thus, if the acceleration curve is more sensitive, the mouse 104 may be moved a shorter distance to get the cursor to move a predetermined distance, as compared with a less sensitive acceleration curve.

The latency characteristic for the IO devices 112 may determine the time difference between when an input may be provided to the IO device 112 and when the input is displayed 108 or otherwise used by the processor 114. In some embodiments the latency characteristic may affect a processing rate of inputs from a sensor or IO device 112. For example, a latency may cause the processor 114 to process certain inputs in bursts. Inputs may be reported to the processor 114 normally, but the processor 114 may queue two or more inputs and then process the inputs substantially simultaneously. Such burst processing may be more power efficient for the processor 114 as it may not have to continuously poll for inputs, but this latency may be noticeable to the user as there may be a delay between when the input was provided and when the output is displayed.

The debounce characteristic or button clicks characteristic may control the sensitivity of a button or switch of the IO devices 112. For example, if a user quickly or forcefully presses a key on the keyboard 106 or the mouse button 126, a double input may be generated and processed by the system. This may occur when an input device uses a mechanical switch to register user input. The switch may oscillate against a contact one or more times before settling into a rest state, especially if a user presses forcefully against a key. By varying the debounce characteristic, when two or more similar inputs are received close in time to each other, only a single input may be produced by the IO device 112. In some embodiments, the debounce characteristic may be time-based such that two inputs to the IO device 112 within a threshold time of each other will cause only a single input to be registered by the IO device 112. With a debounce characteristic incorporated into the keyboard 106, if the user's input causes a key, button, or the like, to contact the switch multiple times, only a single entry may be acknowledged by the device and/or processed by the system. However, for light-force typists, a high value debounce may prevent the keyboard 106 from registering an input.

The timeout characteristic may control how fast a particular input device 112 may switch between particular states, e.g., active, non-active, and sleep. For example, an input device 112 may wait a first period of time and if no input is received it may transition to a non-active state (which may have a reduced sampling rate and/or report rate). Then, after another period (which maybe or may not be equal to the first period), the input device 112 may transition from the non-active state to the sleep state. The faster a particular input device 112 may transition between states may decrease the power consumed by the device 112, as some of the states may require less power as the sampling rate or other characteristics may be reduced during a non-active state.

The sensitivity characteristic may control the amount of force, movement, or other user input that may be required to register as an input for the device 112. In another example, the sensitivity characteristic may determine the ratio between the input from the user and the input provided to the computing device 102. Similarly, the speed characteristic may determine a minimum input speed required to register an input, a processing speed for select inputs, or the like.

In addition to the various characteristics and/or settings that are discussed above, it should be noted that each input device 112 may have select characteristics that may be adjusted by one of the profiles 130a-130e that may not be applicable to the other IO devices 112. For example, the camera 110 may include an image stabilization feature that may counteract movement from a user while he or she is trying to take a picture. Some users may have relatively steady hands or may always use a tripod, and in these cases this characteristic may be turned off in order to reduce power consumption or increase processing speed of the camera 110.

As another example, one input device 112 may be a remote control having an operating range of a predetermined number of feet. In other words, the remote control may be able to transmit signals to the computing device 102 from a distance of 20 feet. In some instances, the transmission distance may be increased or reduced based on the profile 130a-130e. To increase or decrease the transmission distance additional power may be provided to a transmitter or the remote control may include multiple transmitters that may be activated depending on the operating range characteristic selected.

As yet another characteristic example, the profiles 130a-130e may control one or more applications or application settings. Applications may be run, modified, or closed based on the one or more profiles 130a-130e. For example, in a "low power profile," unnecessary or power consuming applications may be turned off, or certain features of those applications may be deactivated.

The aforementioned characteristics and settings are meant as illustrative only, and there may be substantially any number of characteristics or settings for the IO devices 112 and/or computing device 102 that may be altered by one or more of the profiles 130a-130e.

With reference again to FIG. 3, Profile 1 130a may control certain characteristics of the mouse 104. For example, Profile 1 130a may designate a sampling rate and a report rate of 2 ms, a fast acceleration curve, and no timeout. Accordingly, in some instances, Profile 1 may be used when fast responsiveness from the mouse 104 may be desired despite the increase in power consumption. Profile 2 130b may include a fast timeout interval, a reduced sampling rate and/or report rate, and a high quantization value. With Profile 2 130b, the computing device 102 and/or IO devices 112 may have reduced power consumption, but may be sluggish or have reduced sensitivity.

Further, as noted above, the profiles 130a-130e may apply to a single IO device 112, a group of IO devices 112, all of the IO devices 112, the computing device 102, or a combination of the computing device 102 and select IO devices 112. For example, Profile 3 may include an increased speed, an increased sampling rate, and a reduced timeout for the mouse 104 but may have a reduced speed, a reduced sampling rate, and an increased debounce rate for the keyboard 106. Thus, a single profile 130a-130e may change characteristics in different manners for one more of the IO devices 112.

Inputs to Vary Profiles

Figure 4:
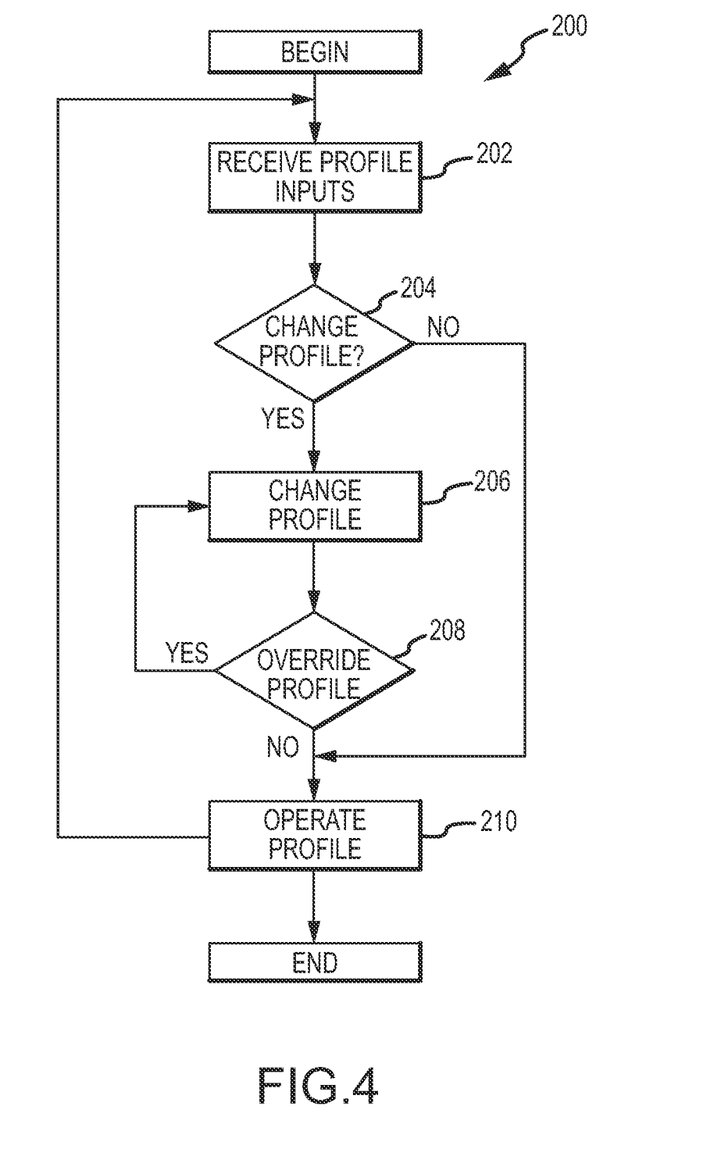
FIG. 4 is a flow chart illustrating a method for varying a management profile of the computing device.
Figure 5:
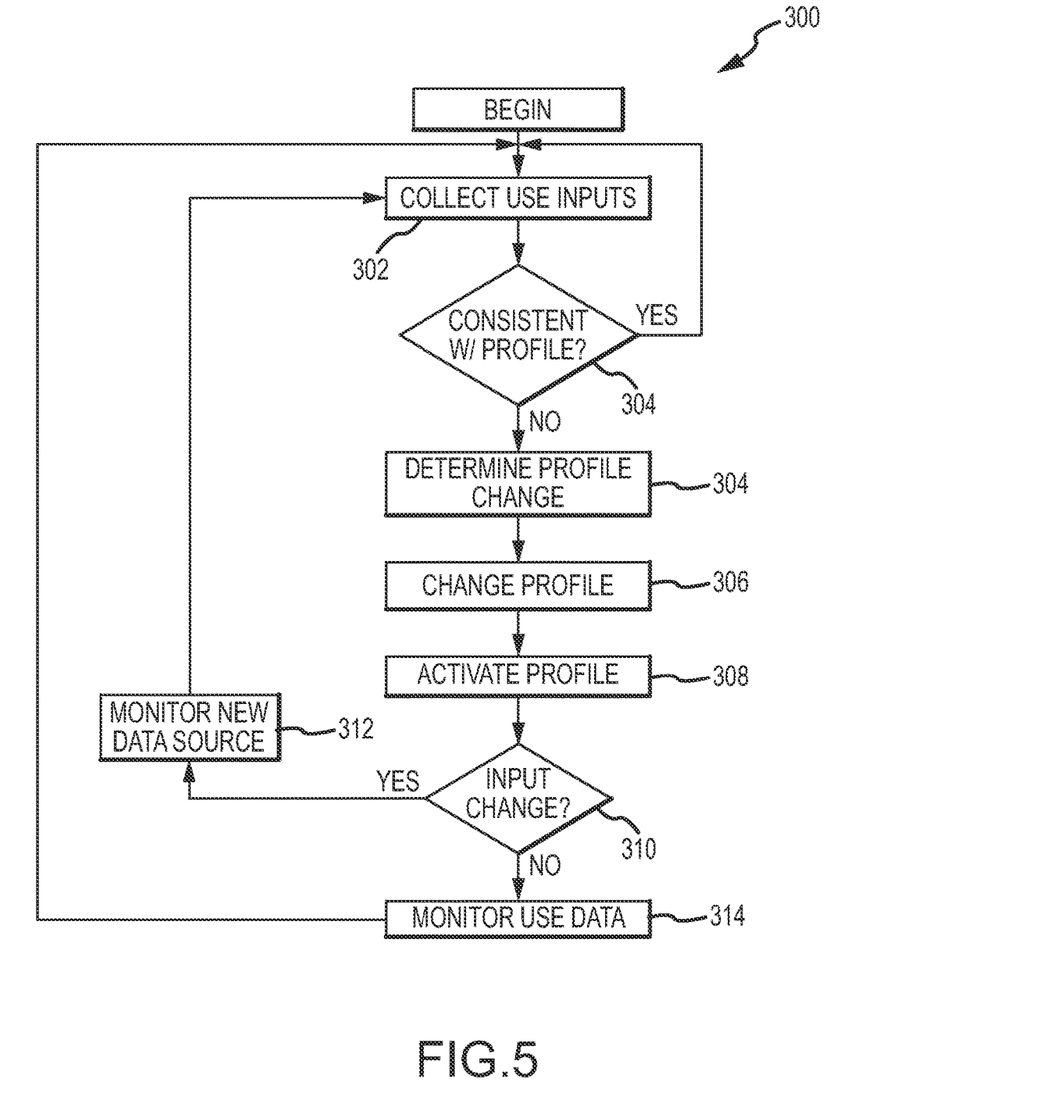
FIG. 5 is a flow chart illustrating a method for varying the management profile based on use input data.
Figure 6:
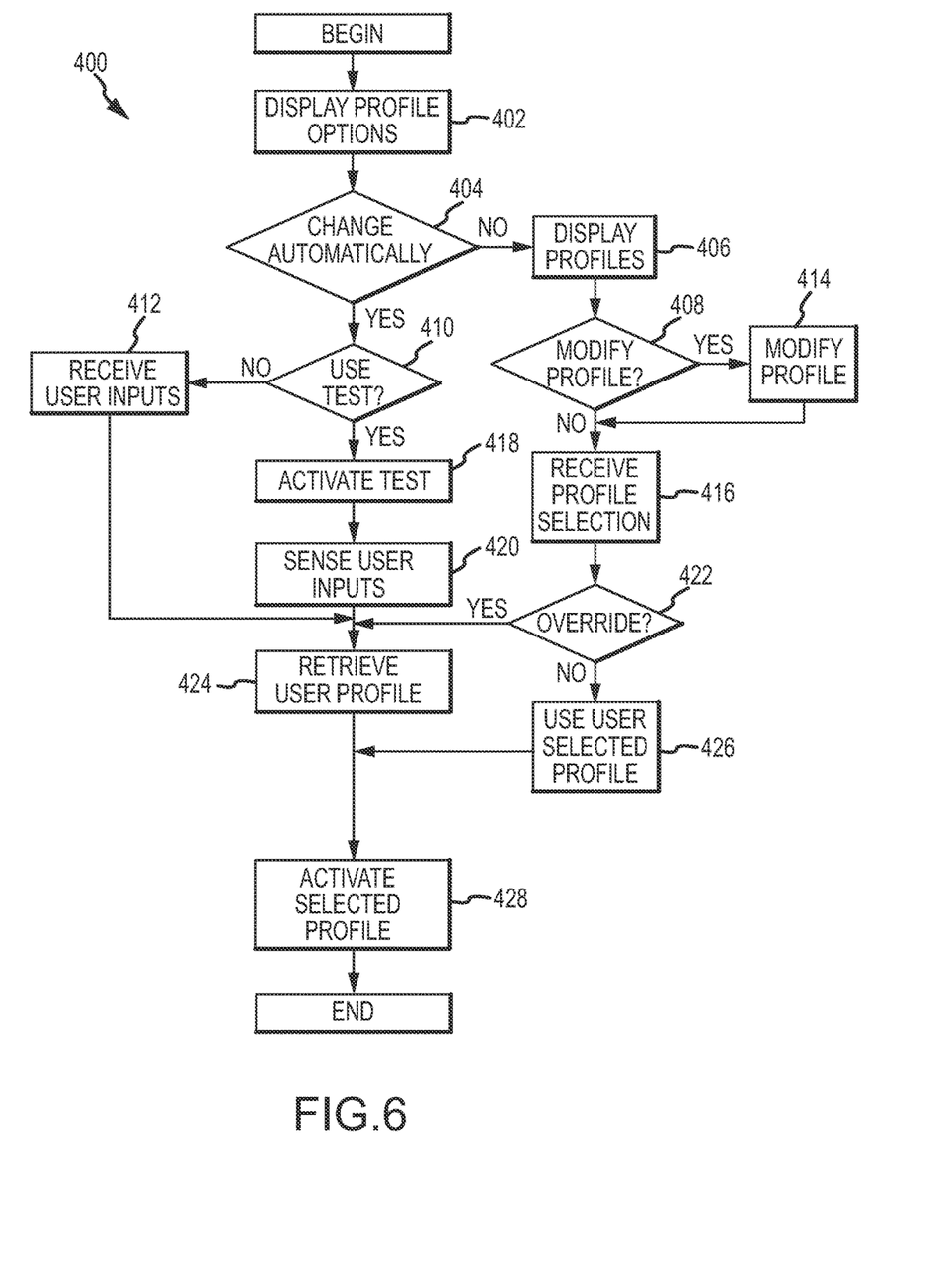
FIG. 6 is a flow chart illustrating a method for varying the management profile based on user input data.

As will be discussed in further detail below with respect to FIGS. 4-6, the system 100 may receive one or more inputs that may be used to determine a profile, switch a profile, or correct a profile for the IO devices 112 and/or computing device 102. The particular IO device 112 may provide an input to the system 100 that may be used to change its profile or the profile of another device 112. For example, an input from the display 108 may be used to change a profile of the keyboard 106.

Some examples of inputs to the system 100 may include mouse movement, input button selection, user presence sensing, use frequency of an input device 112, use time of an input device 112, movement, acceleration, network connections, power level, environment, and so on. The inputs may be provided through one of the IO devices 112 or through the sensors 122 of the computing device 102. For example, the IO devices 112 may include sensors (not shown) that may be used to track one or more inputs for the IO device 112, which may then be transmitted to the processor 114 or to another input device 112. The sensors 122 may determine the number of inputs from the user, the time between inputs, the rate of inputs, characteristics of the inputs (e.g., forceful, fast, etc.), and the like.

Additionally, the IO devices 112 themselves may also be used as inputs for the system 100. For example, the camera 110 may be used to determine if there is a user present in front of the display 108 or to determine an identity of the user (e.g., through facial recognition or the like).

Other inputs may include the type of applications running on the processor 114, icons displayed on the GUI, power source of the computing device 102 or the IO devices 112 (e.g., wired, battery, battery type), altitude, time, day, or the like. For example, while a photo-editing application is running or active, a profile for increased mouse 104 sensitivity may be implemented. As another example, at night-time or low-use hours a "sleep profile" may be implemented to save power for the various IO devices 112. There may be substantially any number of inputs for the system 100 and those inputs may come from the sensors 122 of the computing device 102, sensors of the IO devices 112, the IO devices 112 themselves, or from other sources.

Switching Between Profiles

Using one or more inputs, the profile 130a-130e for one or more of the IO devices 112 and/or computing device 102 may be switched or varied. The switching may be static or may occur dynamically and may adjust as certain inputs vary. FIG. 4 is a flow chart illustrating a method for changing between profiles for the one or more IO devices 112. The method 200 may begin with operation 202 and the processor 114 or a processor for one of the IO devices 112 may receive one or more profile inputs. As described above, the profile inputs may be substantially any type of input that may be determined by the sensors 122, the IO devices 112, or the computing device 102. Additionally, the inputs may be automatically collected (e.g., through the sensors 122) or they may be manually received as they may be directly or manually input by the user. For example, the user may provide inputs regarding his or her desired characteristics for a particular IO device 112.

Once the profile inputs have been received, the method 200 may proceed to operation 204. In operation 204 the processor 114 may determine whether a current profile for one or more of the IO devices 112 may need to be changed. For example, the mouse 104 may be operating Profile 1 130a which may have an increased sampling rate and may be used when the user is playing a game on the computing device 102. However, in operation 202 an input indicating that the game application has been terminated and a word processing or internet browsing application has been activated may be received by the processor 114. In this example, in operation 204, the processor 114 may activate Profile 2 130b for the mouse 104, where Profile 2 130b may have a reduced sampling rate and an increased timeout interval as compared with Profile 1 130a. In other words, in operation 202 the processor 114 may analyze the profile input(s) to determine if the current profile may be optimal or preferred based on the current inputs.

In operation 204, if the processor 114 determines that the current profile may need to change, the method 200 may proceed to operation 206. In operation 206 the processor 114 may change the profile for the one or more IO devices 112. As the profiles 130a-130e may correspond to the characteristics of the one or more IO devices 112, when the profile is changed, one or more characteristics for the one or more IO devices 112 may be altered. Furthermore, as the profiles 130a-130e may also vary characteristics of the computing device 102 and/or processor 114, by changing the profile in operation 206 certain characteristics for the computing device 102 and/or processor 114 may also be changed.

Prior to or after the profile has been changed, the method 200 may proceed to operation 208. Operation 208 may determine whether the selected profile should be overridden or corrected. In some instances the user may provide manual inputs that may require a specific profile to be implemented, but based on certain other inputs the system 100 may determine that another profile may be better. As a specific example, the user may have indicated a profile selection for a "no-sleep" profile for the entire system 100. However, based on the time of day and/or typical user behavior, the processor 114 may determine that this profile selection is not ideal and may override or correct the user selected profile. This type of profile correction is discussed in more detail with respect to FIG. 6.

In operation 208, if the profile should be overridden, the method 200 may return to operation 206 and the profile may be changed again. However, in operation 208, if the profile is not overridden, the method 200 may proceed to operation 210. In operation 210 the processor 114 may activate one or more profiles 130a-130e in the one or more of the IO devices 112. Once active, the particular IO device 112 may have adjusted operating characteristics, as well as adjusted states that may determine further characteristics. For example, one profile 130a-130e may have an active, non-active, and a sleep state and in each of those particular states select characteristics of the IO device 112 may be varied.

In some embodiments, the profile for the one or more of the IO devices 112 may be adjusted substantially automatically by the system 100. FIG. 5 is a flow chart illustrating a method for changing a profile by automatically detecting one or more inputs. The method 300 may begin with operation 302 and the inputs may be collected. In some instances, the inputs may be related to use data for the one or more of the IO devices 112. For example, the collected inputs may be related to the typical usage by the user or inputs entered manually. Examples of these inputs may include how fast a user moves one or more the IO devices 112, the types of applications a user typically utilizes on the computing device 102, how many fingers he or she uses to select a particular input (e.g., track pad input), and so on. In other instances, the inputs may be unrelated to the user, such as inputs related to the overall movement of the IO device 112 or the computing device 102, a remaining charge in a battery source, a location of the IO device 112 or the computing device 102, or the like.

Once the inputs have been collected, the method 300 may proceed to operation 304 and the processor 114 may determine whether a current profile is consistent with the inputs. For example, if a user is a "hunt and peck" typist, then a profile for the keyboard 106 including a high sampling rate may be inconsistent with the use inputs as the user may not provide inputs at a frequency fast enough to justify the increase in power consumption that may occur with the increased sampling rate. As another example, with a track pad, the user may consistently position his or her full palm on the track pad when he or she is moving the cursor or typing on the keyboard 106. In this example, a profile having a sensitive debounce or sensitive track pad may be less desirable than a profile that has a reduced sensitivity or debounce so that accidental selections of the track pad (e.g., by depressing the track pad) may be prevented.

In operation 304, if the processor 114 determines that the current profile is not consistent with the inputs, the method 300 may proceed to operation 304. In operation 304 the processor 114 may determine a new profile for the one or more input devices 112. Once the new profile has been determined, the method 300 may proceed to operation 306 and the processor 114 may change the profile for the one or more input devices 112. The method 300 may then proceed to operation 308 and the profile may be activated on the one or more input devices 112.

After the new profile has been activated on the one or more IO devices 112, the method may proceed to operation 310. In operation 310 the processor 114 may monitor the IO devices 112, the sensors 122, and the like to determine if there is an input change. An input change may be related to a change in the IO devices 112 being utilized by the user, a change in an application by the user, a change in user behavior, or the like. In operation 310, if there is a change in the input type, the method 300 may proceed to operation 312 and a new input data source may be monitored. For example, if the user switches from using the keyboard 106 to using the mouse 104, the processor 114 may monitor data from the mouse 104 rather than data from the keyboard 106. However, if in operation 310 there is not a new source of data, then the method 300 may proceed to operation 314 and the same input data may be monitored for changes. At operation 314, the method 300 may return to operation 302 and new and/or additional input use data may be collected.

In other embodiments, the user may assist in changing a profile for the one or more IO devices 112. FIG. 6 is a flow chart illustrating a method for changing a profile based on direct or manual user input. The method 400 may begin with operation 402 and an application may be initiated and displayed on the display 108. The application may allow the user to adjust certain profiles 130a-130e. After the profile options application and/or icon is displayed, the method 400 may proceed to operation 404. Operation 404 determines whether the user wishes to have the processor 114 change the profiles 130a-130e automatically or whether the user wishes to change the profiles 130a-130e manually.

In operation 404, if the user provides an input to one of the IO devices 112 that he or she wishes to change the profiles 130a-130e of the one or more IO devices 112 manually, the method 400 may proceed to operation 406. In operation 406 the display 108 may display on the GUI one or more of the profiles 130a-130e. The display of the profiles 130a-130e may include a listing of one or more of the characteristics or settings that may be altered by a particular profile 130a-130e. Alternatively or additionally, the profiles 130a-130e may be listed with a description of the goal or theme of the specific profile. For example, if one of the profiles 130a-130e is optimal for a mouse or joystick based computer game, it may indicate that in the description (e.g., "Joystick Gaming Profile").

After operation 406, the method 400 may proceed to operation 408 and the display 108 may display an option whether the user may wish to modify one or more of the profiles 130a-130e. In operation 408, if the user provides an input indicating that he or she wishes to modify one or more of the profiles 130a-130e the method 400 may proceed to operation 414 and the user may modify one of the profiles 130a-130e. As described above, the profiles 130a-130e may include values or settings for one or more characteristics of one or more IO devices 112. Thus, in operation 414 the method may allow a user to select certain characteristics for one or more profiles 130a-130e that he or she may change. This may allow the profiles 130a-130e to be customized based on the desires of a particular user. For example, a user may wish to use a "power saving" profile, but may still want a highly responsive mouse. In this case, the user may modify the predetermined "power saving" profile to vary the sampling rate or other characteristic of the mouse 104, while maintaining the previous settings of the other characteristics.

In operation 408, if the user selects to not modify any of the profiles 130a-130e, the method 400 may proceed to operation 416. In operation 416 the computing device 102 may receive a profile selection from the user. The profile section may include one more of the profiles 130a-130e stored in the memory 118 or may include one or more of the profiles modified by the user. Furthermore, the profile selection may be for a single profile 130a-130e or for a set of profiles 130a-130e that may be active depending on one or more of the particular inputs. For example, the user may select rules for the processor 114 to dynamically adjust profiles 130a-130e. In this example, the user may select a first profile to be activated when a specific application is operating (e.g., a slow keyboard sampling rate when an internet browser is open), and a second profile to be activated when a minimum level of movement is exceeded (e.g., increased debounce for the keyboard 106 if the accelerometer registers a threshold amount of movement).

The method 400 may then proceed to operation 422 and the processor 114 may determine whether the user's selection should be overridden. For example, the user may have selected certain profiles 130a-130e that may be less than ideal for a sensed user behavior or other user inputs. For example, the user may have indicated that he or she wishes to have a high sampling rate for the keyboard 106 but in actuality may be a slow typist, where the increased sampling rate does not equal an increase in performance for the keyboard 106. Thus, the user's selection of a high sampling rate may be overridden. In this case, the method 400 may proceed to operation 424 and a user profile (as created by the processor or selected by the processor 114) may be retrieved, this is discussed in more detail below.

In operation 422, if the user-selected profile(s) is not overridden, the method 400 may proceed to operation 426 and the system 100 may implement the user selected profile(s). The method 400 may then proceed to operation 428 and the selected profile may be activated for the one or more IO devices 112. Alternatively or additionally, the selected profile may be stored in the memory 118 and may be activated under the correct circumstances or predetermined inputs.

Referring again to operation 404, if the user determines that he or she would like the computing device 102 to change the profile(s) automatically, the method 400 may proceed to operation 410. In operation 410, the computing device 102 may determine whether the user would like to complete a use test or not. For example, the use test may be an application that provides sample applications or situations and the user may use select IO devices 112 as he or she may do normally. The system 100 may then have a test profile that may have an increased sampling rate, more active sensors, or other input collection mechanisms in order to better determine the behaviors and tendencies of the user.

In operation 410, if the user wants to use the use test, the method 400 may proceed to operation 418 and the test may be activated. As briefly described above, the computing device 102 may activate a test application and/or may activate a test profile to collect data from the user. Once the use test has been activated, the method 400 may proceed to operation 420 and the one or more IO devices 112 and/or the sensors 122 may sense various user inputs.

In operation 410, if the user did not select a use test, the method 400 may proceed to operation 412. In operation 412, the system 100 may collect and/or receive various user inputs from the one or more IO devices 112 and/or sensors 122. However, these inputs may be received outside of a specific "test" program and rather while a user is using the system 100 normally.

After either operations 412 or 410, the method may proceed to operation 424 and the selected profile may be retrieved from the memory 118. The profile 130a-130e retrieved may be one or more of the profiles 130a-130e stored in the memory 118 or may be a new profile created by the processor 114 based on the selected user's behaviors/tendencies. Once the profile is retrieved, the method 400 may proceed to operation 428 and the selected profile may be activated on the one or more IO devices 112. After the profile 130a-130e is selected it should be noted, that in some embodiments, the system 100 may continue to receive inputs from the IO devices 112 and may dynamically alter the profile based on new inputs or the like.

CONCLUSION

The foregoing description has broad application. For example, while examples disclosed herein may focus on IO devices, it should be appreciated that the concepts disclosed herein may equally apply to substantially any component of a computing device or in communication with the computing device. Similarly, although the inputs may be discussed with respect the IO devices, the methods are equally applicable substantially any type of input, as sensed by sensors within the computing device or separate therefrom. Accordingly, the discussion of any embodiment is meant only to be exemplary and is not intended to suggest that the scope of the disclosure, including the claims, is limited to these examples.

What is claimed is:
1. A method for operating an input device of a computing device, the method comprising:
at the computing device:
while the input device is operating in accordance with a first input profile:
detecting a first type of input with the input device;
in accordance with detecting a wireless communication with an input/output (i/o) device, wherein the input/output device is communicatively coupled with the input device and is capable of providing a second type of input to the input device, adjusting operation of the input device from the first input profile to a second input profile; and
operating the input device in accordance with the second input profile in response to detecting wireless input from the i/o device, wherein the first input profile and the second input profile specify operation of the input device at different sampling rates and/or different reporting rates.

2. The method of claim 1,
wherein operating the input device in accordance with the first input profile comprises operating the input device at a first sampling rate, and
wherein operating the input device in accordance with the second input profile comprises operating the input device at a second sampling rate that is higher than the first sampling rate.

3. The method of claim 1, wherein the input device is a touch screen display and the first type of input is a touch input at the touch screen display.

4. The method of claim 3, wherein the second input profile adjusts a debounce characteristic for the input device.

5. The method of claim 3, wherein the second type of input corresponds to a different dots per square inch value than the first type of input.

6. The method of claim 1, wherein: i) the first input profile comprises a normal operating profile, ii) the normal operating profile controls a characteristic of the input device when the input device executes a word processing application, and iii) the second input profile comprises a gaming profile.

7. The method of claim 1, wherein the second input profile includes a sensitivity characteristic for determining an amount of force associated with the second type of input.

8. The method of claim 1, further comprising:
when the input device is detecting a wireless input from the i/o device:
causing a reporting rate of the input device to increase.

9. A computing device comprising:
a memory;
a processor;
an input device configured to detect a first type of input while the input device is operating in accordance with a first input profile; and
a communications device configured to wirelessly connect to an input/output (i/o) device and receive a second type of input from the i/o device,
wherein the memory comprises instructions that when executed by the processor cause the computing device to:
detect the second type of input from the i/o device to produce a detection result, and
switch, based on the detection result, the input device from operating with the first input profile to operating with the second input profile.

10. The computing device of claim 9, wherein the input device is a touch screen display and the first type of input is a touch input at the touch screen display.

11. The computing device of claim 9, further comprising:
a power source configured to power the i/o device when the i/o device is connected to the computing device.

12. The computing device of claim 9, wherein the second input profile corresponds to a higher sampling rate than the first input profile.

13. The computing device of claim 9, wherein the second input profile includes a sensitivity characteristic for determining an amount of force associated with the second type of input.

14. The computing device of claim 9, wherein the communications device is further configured to cause a reporting rate of the i/o device to increase when the i/o device wirelessly connects to the communications device.

15. A non-transitory computer readable medium configured to store instructions that, when executed by one or more processors of a computing device that includes an input device, cause the computing device to perform steps that include:
detecting a first type of input with the input device while the input device is using a first input profile; and
when an input/output (i/o) device capable of providing a second type of input is in wireless communication with the computing device:
detecting the second type of input from the i/o device to produce a detection result, and
switching, based on the detection result, the input device from operating with the first input profile to operating with the second input profile.

16. The non-transitory computer readable medium of claim 15, wherein the second input profile comprises a parameter corresponding to a higher sampling rate than a sampling rate of the first input profile.

17. The non-transitory computer readable medium of claim 15, wherein the input device is a touch screen display and the first type of input is a touch input at the touch screen display.

18. The non-transitory computer readable medium of claim 17, wherein the second input profile adjusts a debounce characteristic for the first type of input.

19. The non-transitory computer readable medium of claim 15, wherein the steps further include:
when the i/o device is connected to the computing device:
supplying power, from a power source of the computing device, to the i/o device.

20. The non-transitory computer readable medium of claim 15, wherein the second input profile includes a sensitivity characteristic for determining an amount of force associated with the second type of input.

* * * * *